(12) United States Patent
Wada et al.

(10) Patent No.: US 6,750,779 B2
(45) Date of Patent: Jun. 15, 2004

(54) INDICATING INSTRUMENT FOR VEHICLE

(75) Inventors: Toshiki Wada, Kariya (JP); Katsuhiro Kumazawa, Anjo (JP)

(73) Assignee: Denso Corporation, Kariya (JP)

( * ) Notice: Subject to any disclaimer, the term of this patent is extended or adjusted under 35 U.S.C. 154(b) by 51 days.

(21) Appl. No.: 10/196,244

(22) Filed: Jul. 17, 2002

(65) Prior Publication Data

US 2003/0043048 A1 Mar. 6, 2003

(30) Foreign Application Priority Data

Sep. 4, 2001 (JP) ........................................ 2001-267931

(51) Int. Cl.[7] ................................................. G08B 5/36
(52) U.S. Cl. ............................ 340/815.55; 340/815.65; 340/815.66
(58) Field of Search ...................... 340/815.4, 815.43, 340/815.45, 815.47, 815.49, 815.55, 815.56, 815.65, 815.66, 450.2, 441; 362/23, 27, 28; 349/65, 97, 98; 359/272, 275

(56) References Cited

U.S. PATENT DOCUMENTS

| | | | | | |
|---|---|---|---|---|---|
| 3,998,525 | A | * | 12/1976 | Giglia | 359/275 |
| 6,204,899 | B1 | * | 3/2001 | Hall | 349/65 |
| 6,302,551 | B1 | * | 10/2001 | Matumoto | 362/27 |
| 6,499,852 | B1 | * | 12/2002 | Kino et al. | 362/23 |
| 6,531,230 | B1 | * | 3/2003 | Weber et al. | 357/577 |

FOREIGN PATENT DOCUMENTS

| | | |
|---|---|---|
| JP | A-2-234857 | 9/1990 |
| JP | B2-8-14500 | 2/1996 |

* cited by examiner

*Primary Examiner*—Van T. Trieu
(74) *Attorney, Agent, or Firm*—Posz & Bethards, PLC

(57) ABSTRACT

In an indicating instrument for a vehicle, a light modulation member having variable light transmissivity is disposed on a dial plate. The light modulation member includes a plurality of variable light modulation sections respectively connected to a controller that controls light transmissivity of each one of the variable light modulation sections.

7 Claims, 9 Drawing Sheets

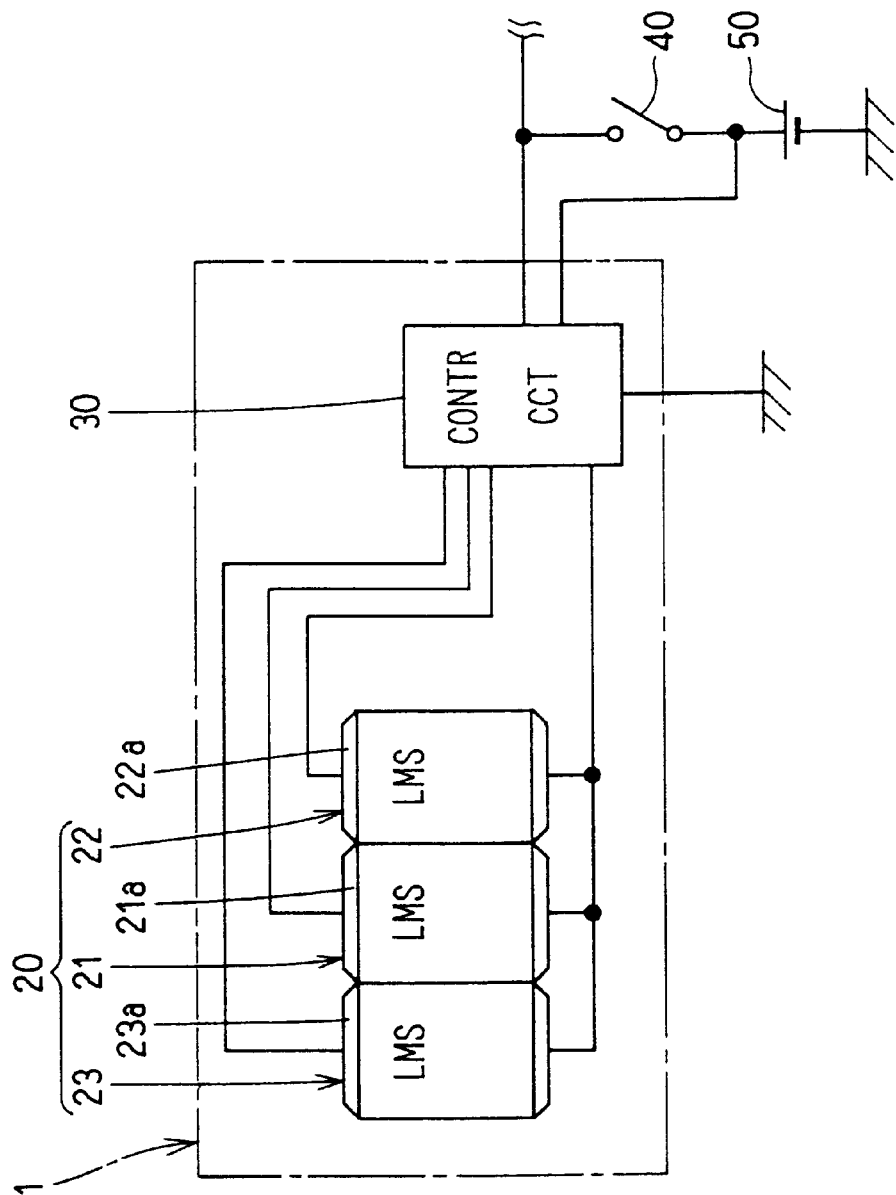

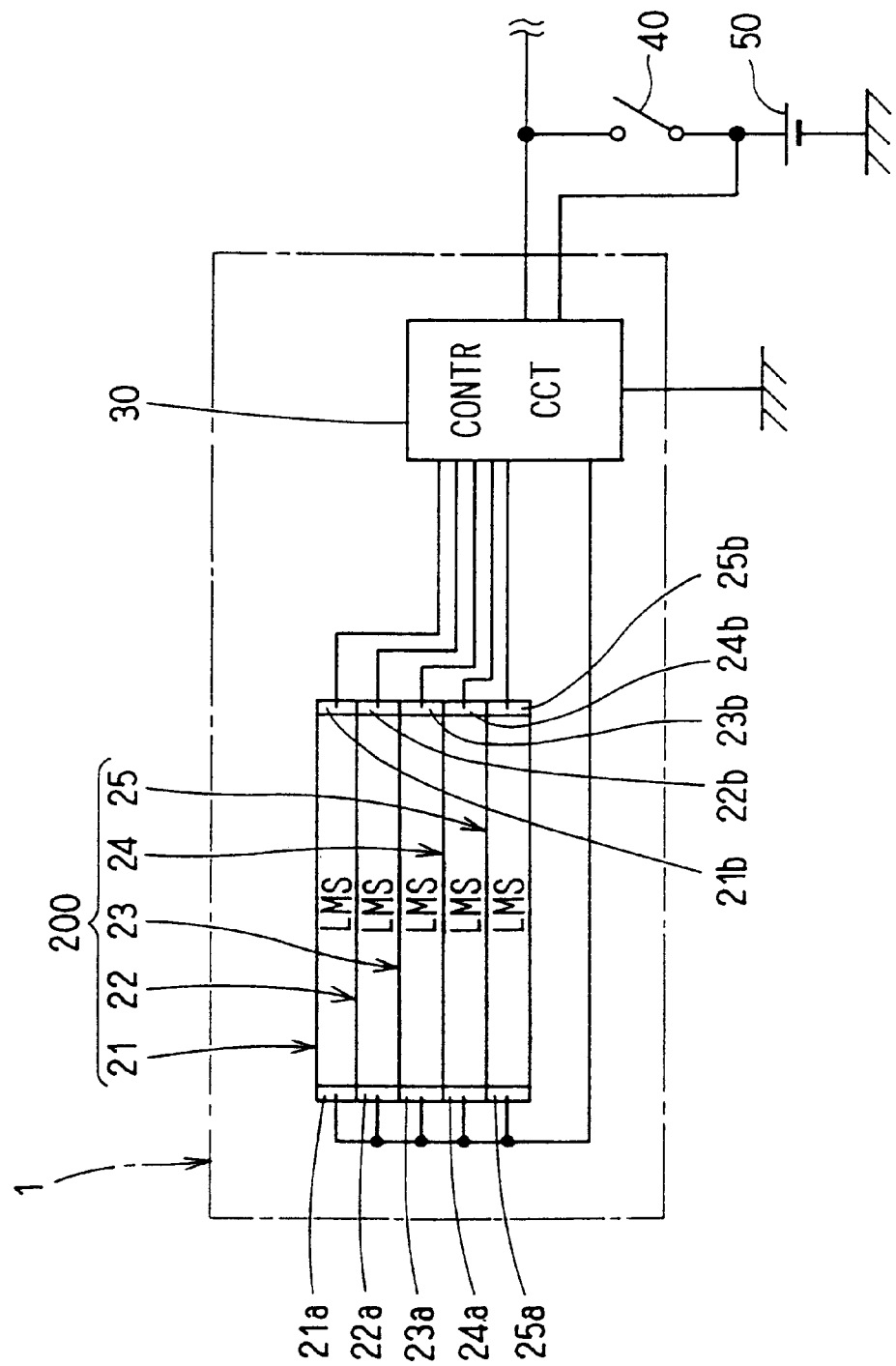

IG-SWITCH OFF

INDICATING INSTRUMENT FOR VEHICLE

CROSS REFERENCE TO RELATED APPLICATION

The present application is based on and claims priority from Japanese Patent Application 2001-267931, filed Sep. 4, 2001, the contents of which are incorporated herein by reference.

BACKGROUND OF THE INVENTION

1. Field of the Invention

The present invention relates to an indicating instrument for a vehicle, particularly an automobile.

2. Description of the Related Art

Recently, in an indicating instrument for an automobile, various arrangements have been adopted to provide attractive and novel displays such as an indicating instrument disclosed in JP-A-2-234857. In the disclosed indicating instrument, a so-called black face meter is provided. That is, an electrochromic display device (ECD) is disposed on a dial plate to change the light transmissivity of the ECD according to the operating condition of the dial plate.

Because the light transmissivity of the ECD is changed monotonously in such an indicating instrument, the display is not very attractive and novel.

SUMMARY OF THE INVENTION

Therefore, the present invention has been made in view of the above problems.

It is a main object of the invention to provide an indicating instrument for a vehicle that has attractive and novel displays.

According to a feature of the invention, an indicating instrument for a vehicle includes a dial plate, a light modulation member having variable light transmissivity disposed on the dial plate and a control means for controlling said transmissivity. The light modulation member includes a plurality of variable light modulation sections respectively connected to the control means. The control means controls light transmissivity of each one of the variable light modulation sections.

Therefore, a driver can enjoy a gradually changing, novel and attractive display on the dial plate.

According to another feature of the invention, the dial plate has a plurality of display portions, and each display portion is covered by one of the variable light modulation sections. Therefore, the driver can enjoy a plurality of displays changing differently from each other.

According to another feature of the invention, the control means controls each of the light modulation sections according to a predetermined condition. Preferably, the control means controls each of the light modulation sections when an ignition switch of a vehicle is turned on. The control means may control each of the light modulation sections to successively increase the light transmissivity thereof when the ignition switch is turned on, and to successively decrease the light transmissivity when the ignition switch is turned off.

On the other hand, the control means may control each of the light modulation sections to successively decrease the light transmissivity thereof when the ignition switch is turned on, and to increase the light transmissivity when the ignition switch is turned off.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIG. 4 is a block diagram of a control circuit of the combination meter according to the first embodiment;

FIGS. 5A, 5B and 5C are graphs showing input voltage E of each of light modulation sections decreasing at different delay time after an ignition switch is turned on;

FIG. 8 is a block diagram of a control circuit of the combination meter according to the second embodiment;

FIGS. 9A, 9B, 9C, 9D and 9E are graphs showing the input voltage E of each of the light modulation sections of the combination meter according to the second embodiment decreasing at different delay time after the ignition switch is turned on.

DETAILED DESCRIPTION OF THE PREFERRED EMBODIMENTS

Figure 1:
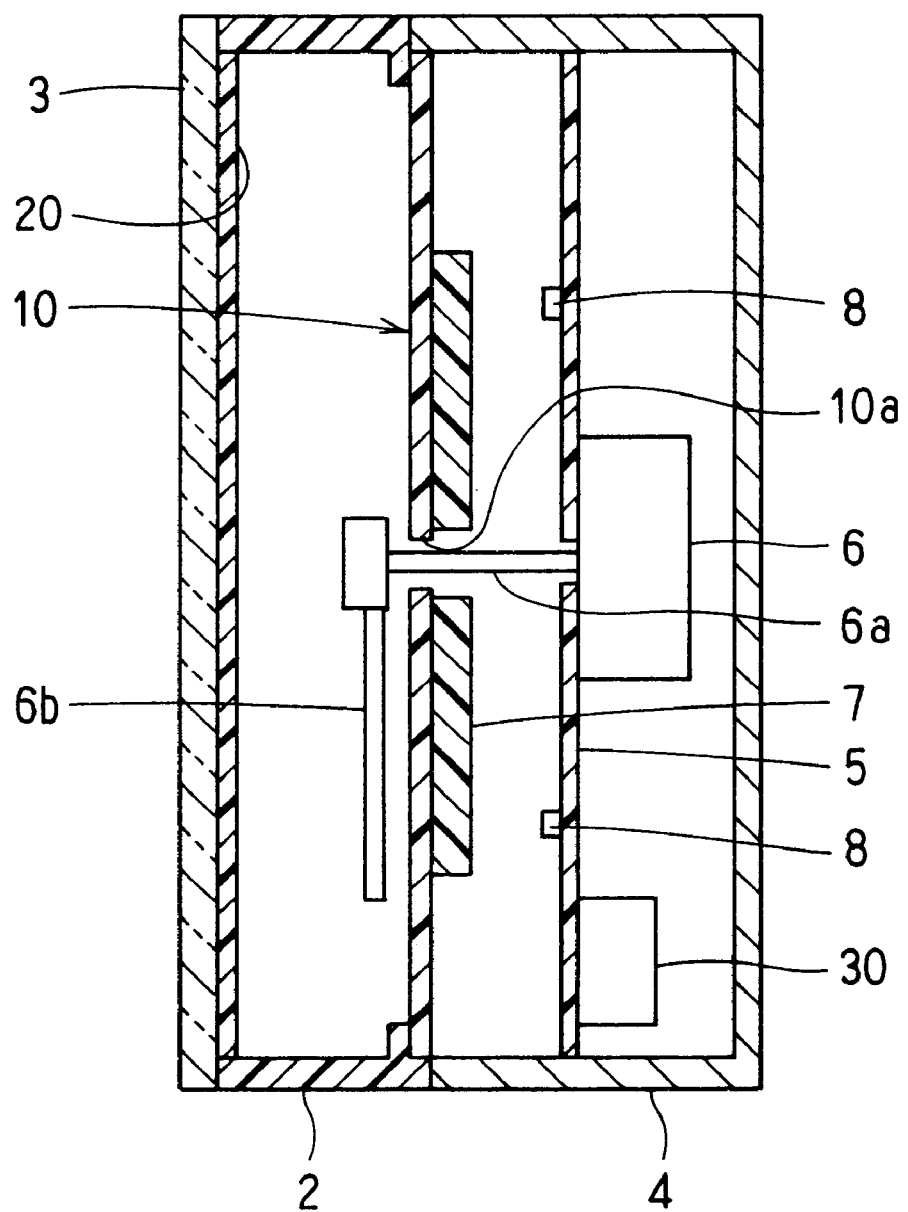
FIG. 1 is a schematic cross-sectional diagram of a combination meter, which is cut along line I—I in FIG. 2, according to the first embodiment of the invention.
Figure 2:
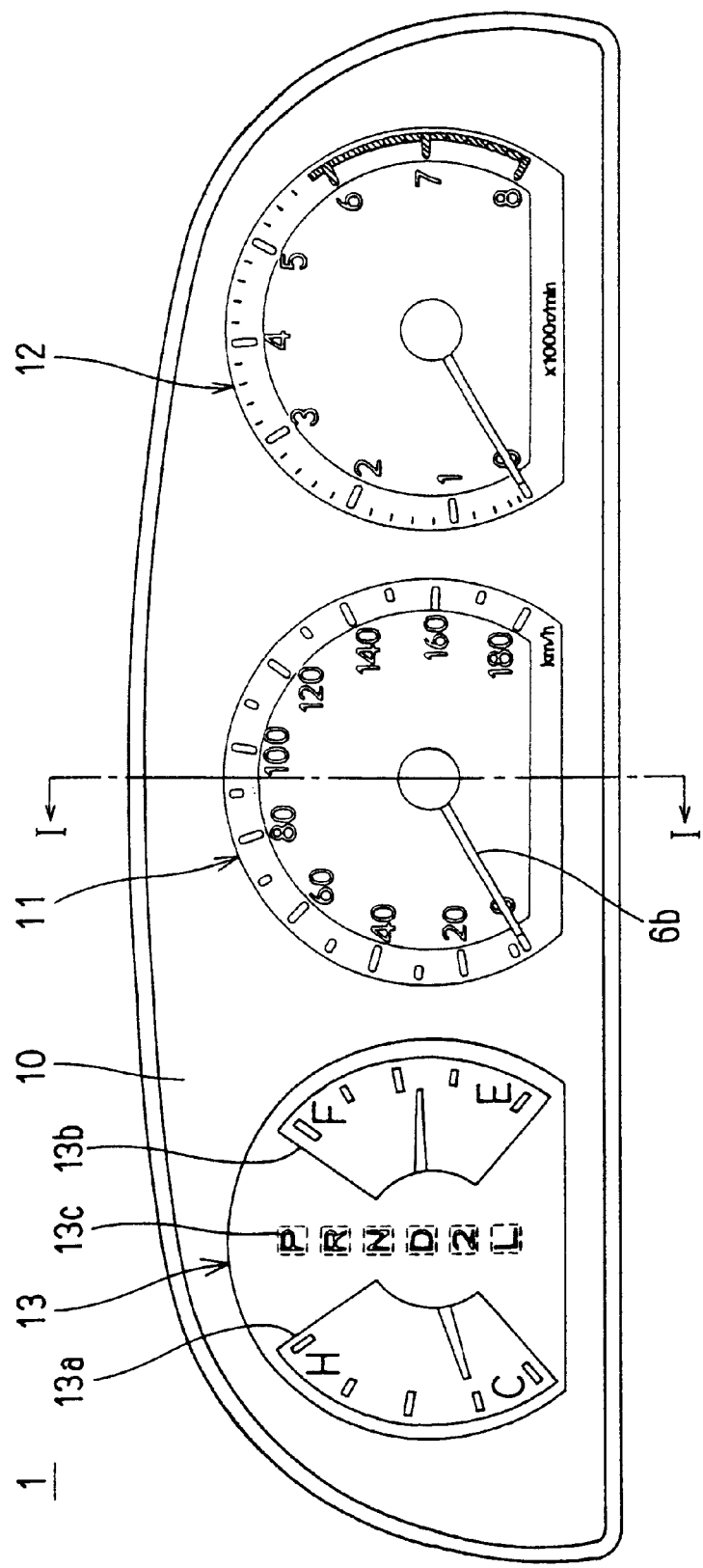
FIG. 2 is a front view of the combination meter according to the first embodiment.

As shown in FIGS. 1 and 2, a combination meter 1, which is a typical indicating instrument for a vehicle, is disposed at a front position of a vehicle where a driver can see it easily. The combination meter 10 has a dial plate 10. The dial plate 10 is made of a polycarbonate plate and has a plurality of display portions 11, 12, 13, which are generally formed by means of hot stamping or the like. The display portions 11, 12, 13 may be formed from a plurality of thin sheets of film pasted to the polycarbonate plate. The display portion 11 forms a speedometer, the display portion 12 forms an engine tachometer, and the display portion 13 forms a combined display of a coolant temperature gauge 13a, fuel gauge 13b and a transmission-gear-shift indicator 13c.

A casing 4 is disposed at the back of the dial plate 10 to accommodate a printed circuit board 5 that forms an electric circuit of the combination meter 1. A movement 6 is disposed on the back (the right surface in FIG. 1) of the printed circuit board 5 to drive a pointer shaft 6a. The pointer shaft 6a extends upward through a hole 10a of the dial plate 10 and has a pointer 6b at the top end thereof. A pair of light emitting diodes (LEDs) 8 is mounted on the front surface of the printed circuit board 5 to illuminate the dial plate 10. A controller 30 is also mounted on the back of the printed circuit board 5.

A light conducting plate 7 is fixed to the back of the dial plate 10 to conduct the light emitted from the LEDs 8 to suitable locations of the dial plate 10. The light conducting plate 7 is made of a transparent plate such as an acrylic resin plate.

A glass cover 3 is fixed to an end of a ring-shaped hood 2 to cover the front surface of the dial plate 10. The glass cover 3 is made of a transparent polycarbonate plate or the like. A light modulation film 20 is pasted on the whole surface of the glass cover 3 opposite the dial plate 10. The light modulation film 20 is a film member that has a variable light transmissivity.

Figure 3:
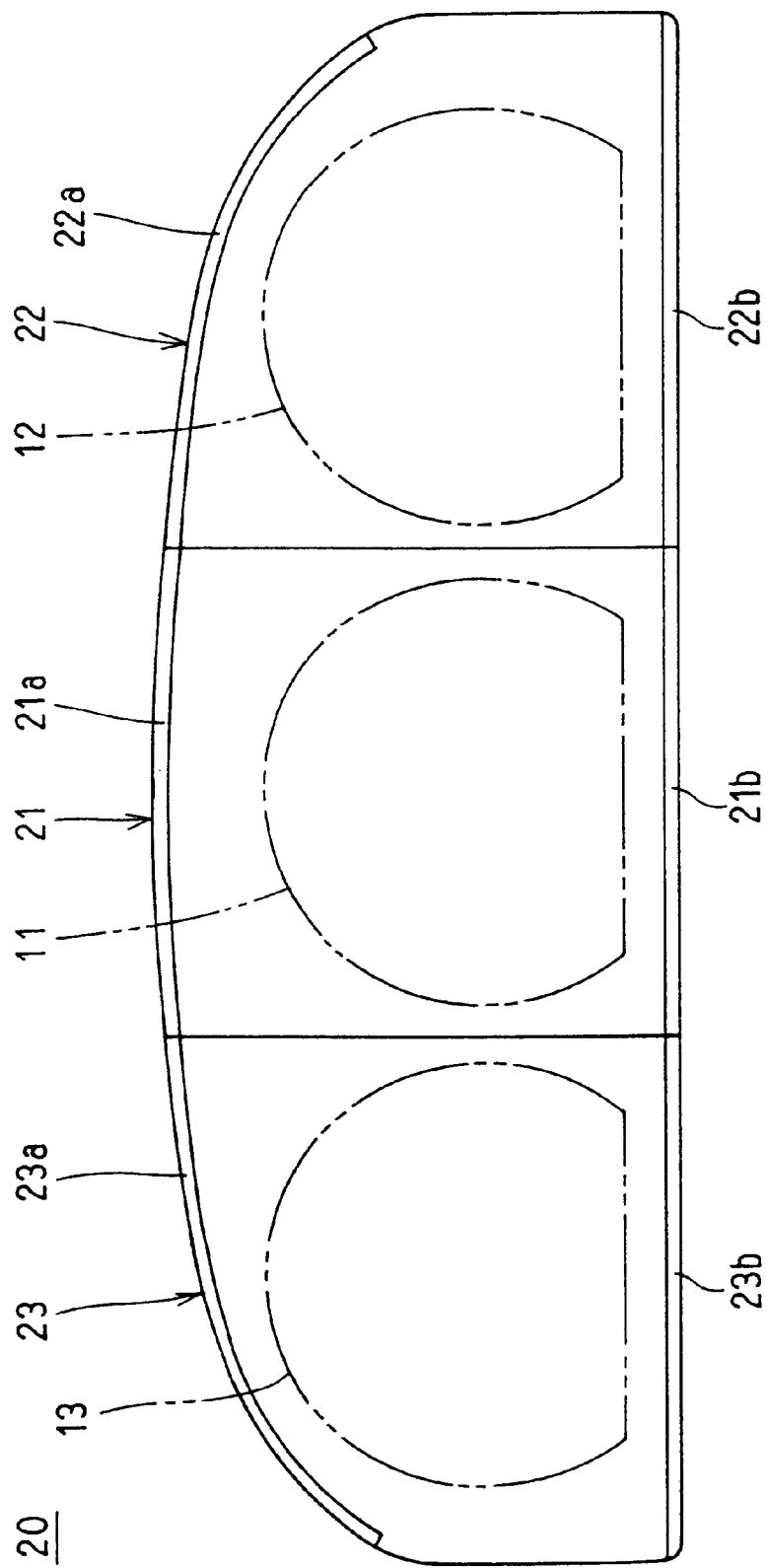
FIG. 3 is a front view of a light modulation member of the combination meter according to the first embodiment.

The light modulation film 20 is comprised of an electrochromic display device (ECD) that is disposed between, and protected by, a pair of glass panels. As shown in FIG. 3, the light modulation film 20 is comprised of three light modulation sections (LMS) 21, 22, 23 that respectively correspond to three display portions 11, 12, 13 of the dial plate 10, which are indicated by two-dot chain lines. That is, the light modulation sections 21, 22, 23 respectively cover the display portions 11, 12 13 after the light modulation film 20 is fixed to the combination meter 1. The light modulation sections 21, 22, 23 respectively have pairs of electrodes 21a and 21b, 22a and 22b, and 23a and 23b. The light transmissivity of the light modulation sections 21 is changed when voltage applied across the electrodes 21a and 21b is changed. The light transmissivity of the light modulation sections 22 is changed when voltage applied across the electrodes 22a and 22b is changed, and the light transmissivity of the light modulation sections 23 is changed when voltage applied across the electrodes 23a and 23b is changed. When the voltage applied across the pair of the electrode is zero, the light transmissivity is the highest, so that the light modulation section becomes transparent. As the voltage becomes higher, the light transmissivity lowers. When the voltage becomes a maximum value Ec, the light transmissivity becomes the lowest, so that the light modulation section becomes dark blue or black.

The voltage applied to each of the light modulation sections 21, 22, 23 is controlled separately from each other, so that the light transmissivity of the light modulation sections can be controlled separately from each other. The controller 30 is formed in a hybrid IC, which is mounted on the printed circuit board 5.

While an ignition switch 40 is not turned on, voltage Ec is applied by the controller 30 to the light modulation sections 21, 22, 23. Therefore, the light transmissivity of each of the light modulation sections 21, 22, 23 is the lowest. Therefore, all the light modulation sections are dark blue or black. Accordingly, a driver can not see the display portions 11, 12, 13 and feels as if there is no display.

Figure 5A:
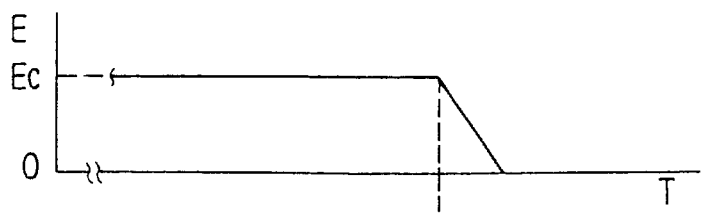
Figure 5B:
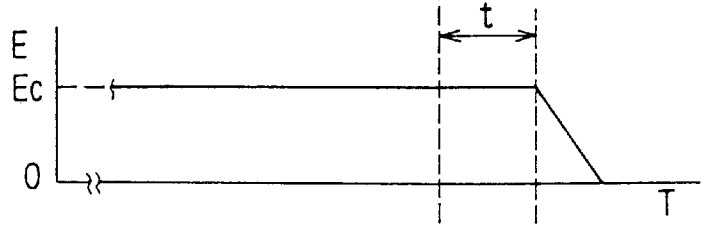
Figure 5C:
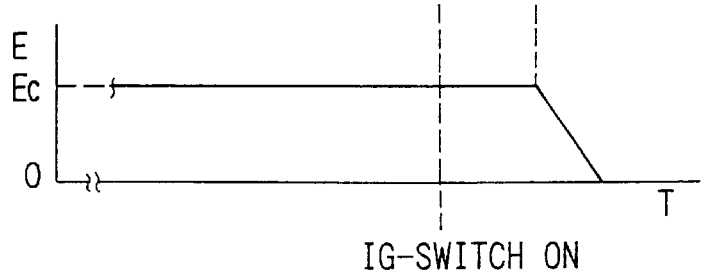

When the ignition key 40 is turned on, the battery 50 energizes the controller 30, which detects turn-on of the ignition key 40. The controller applies control voltage to the light modulation sections 21, 22, 23, thereby to control the light transmissivity of the light modulation sections 21, 22, 23, as shown in FIGS. 5A, 5B and 5C.

Figure 6A:
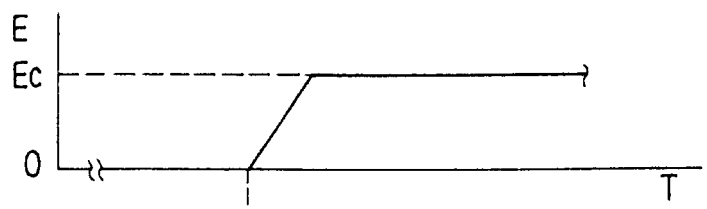
FIGS. 6A, 6B and 6C are graphs showing the input voltage E of each of the light modulation sections increasing at different delay time after the ignition switch is turned off.
Figure 6B:
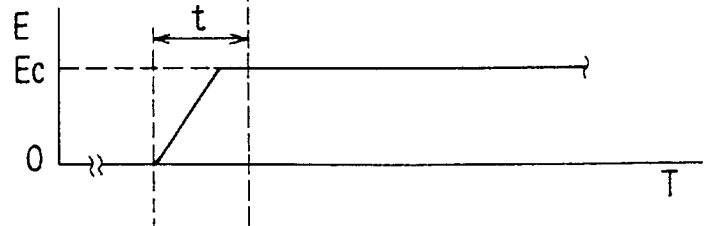
Figure 6C:
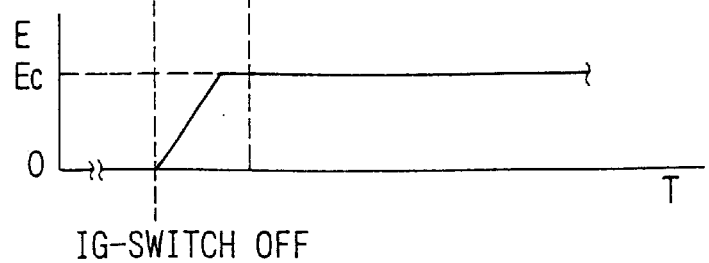

That is, the controller 30 gradually decreases the voltage applied to the light modulation sections 21 to zero to gradually increase the light transmissivity thereof first. After a suitable delay time t, the controller 30 gradually decreases the voltage applied to the light modulation sections 22, 23 to zero to gradually increase the light transmissivity thereof. If the driver looks at the dial plate 10, the central display portion 11 gradually comes in his sight and, then, the side display portions 12, 13 come in his sight. He may feel as if a curtain of a theater opens at the center of the stage thereof toward the opposite sides thereof. When the ignition switch 40 is turned off, the controller detects turning-off of the ignition switch 40. The controller 40 applies control voltage E to the light modulation sections 21, 22, 23, as shown in FIGS. 6A, 6B and 6C.

Firstly, the controller 30 gradually increases the control voltage E applied to the side light modulation sections 22, 23 to Ec. After a delay time t, the controller gradually increases the control voltage E applied to the central light modulation section 21.

If the driver looks at the dial plate 10, the side display portions 12, 13 gradually fade away and completely disappear, and, thereafter, the central display portion 11 gradually fades away and disappears. He may feel as if a curtain of a theater closes from the opposite sides of the stage toward the center thereof. Thus, the combination meter 1 provides a novel and attractive display.

The number of the light modulation sections can be changed to four or more, or two or less.

The controller 30 can gradually decreases the voltage applied to the side light modulation sections 22, 23 first instead of the central light modulation section. After a suitable delay time t, the controller 30 gradually decreases the voltage applied to the light modulation section 21 to zero to gradually increase the light transmissivity thereof.

The ECD can be substituted by a display made of transparent ceramics or a liquid crystal shutter.

An indicating instrument for a vehicle according to the second embodiment of the invention is described with reference to FIGS. 7–10. Incidentally, the same reference numeral in the drawings is the same or substantially the same as that described above. Therefore, detailed description thereof is omitted.

Figure 7:
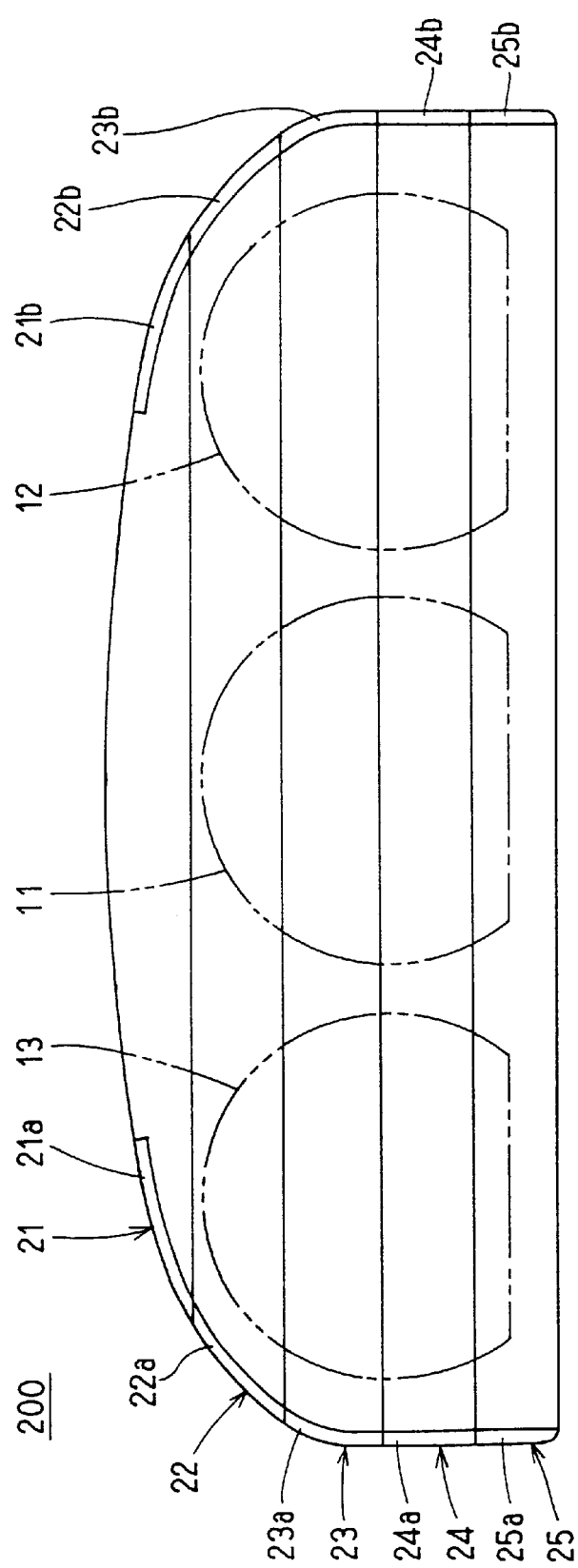
FIG. 7 is a front view of a light modulation member of a combination meter according to the second embodiment of the invention.
Figure 9A:
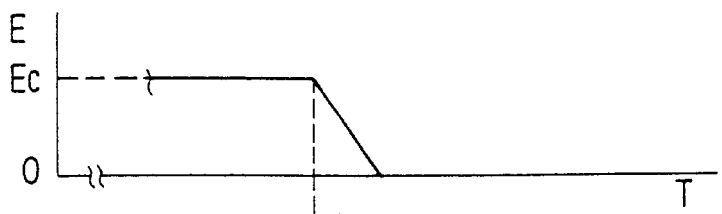
Figure 9B:
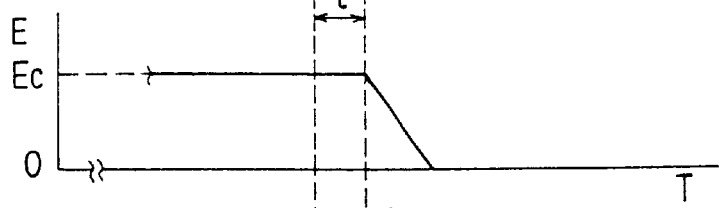
Figure 9C:
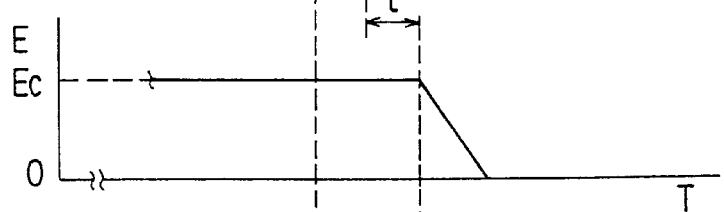
Figure 9D:
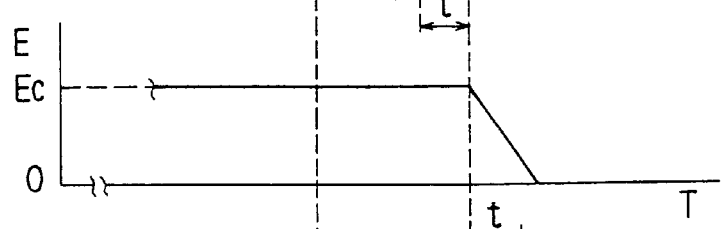
Figure 9E:
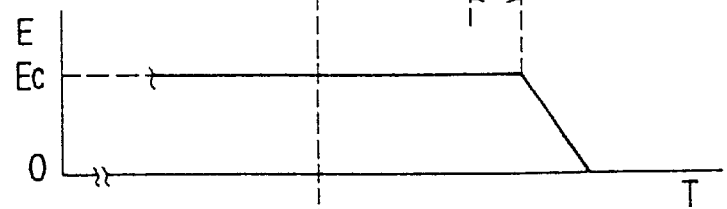
Figure 10A:
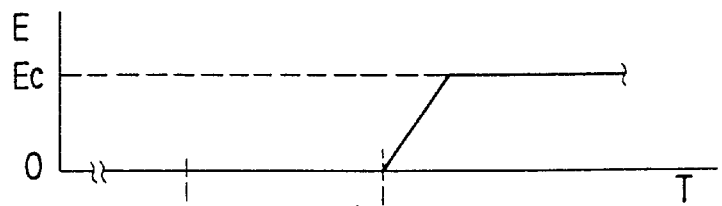
FIGS. 10A, 10B, 10C, 10D and 10E are graphs showing the input voltage E of the light modulation sections of the combination meter according to the second embodiment increasing at different delay time after the ignition switch is turned off.
Figure 10B:
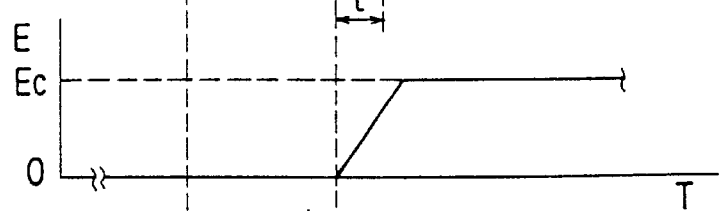
Figure 10C:
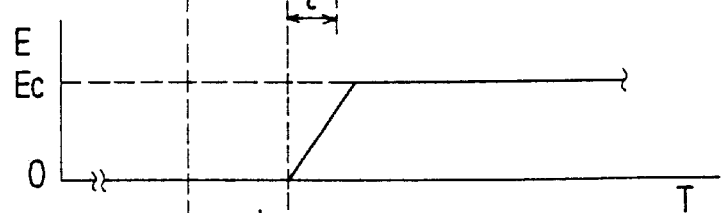
Figure 10D:
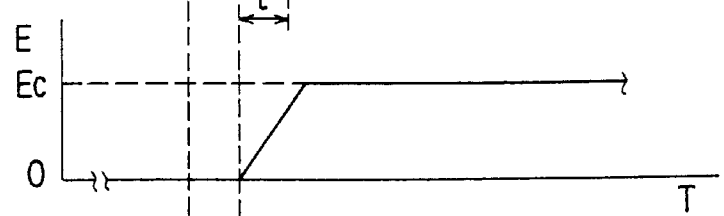
Figure 10E:
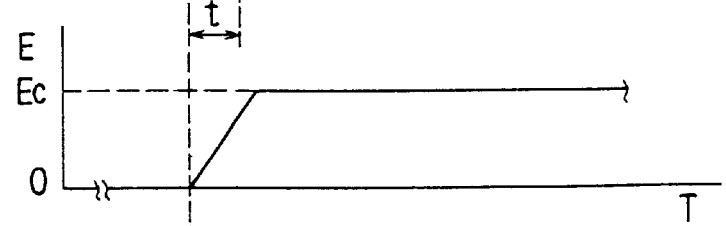

A light modulation film 200 is comprised of five belt-like light modulation sections 21, 22, 23, 24, 25 disposed side by side in the lateral direction of the film 200, as shown in FIG. 7. Each of the light modulation sections 21, 22, 23, 24, 25 is connected to the controller 30, as shown in FIG. 8, so that the controller 30 can separately apply control voltage to them.

While the ignition switch 40 is not turned on, the controller 30 applies control voltage Ec to the light modulation sections 21–25 so that all of them remain dark blue or black. Therefore, even if a driver looks at the dial plate 10, he can not see the display portions 11, 12, 13 though the light modulation film 20.

When the ignition switch 40 is turned on, the controller 30 is energized by the battery 50. Subsequently, the controller 30 detects turn-on of the ignition switch 40 and applies control voltage E to the light modulation sections 21–25, thereby controlling the light transmissivity of the light modulation sections 21–25. As shown in FIGS. 9A–9E, the control voltage E applied to all the light modulation sections 21–25 is decreased from the section 21 at intervals of time t. Accordingly, the light transmissivity or transparency of the light modulation sections 21–25 successively increases from the section 21. When the driver looks at the dial plate 10, the upper portion of the display portions 11, 12, 13 becomes visible from beginning, and the whole portion thereof becomes clearly visible after certain time passes. As a result, the driver feels as if he saw the rising sun at a mountain, where the sun is gradually shining on a mountain from the summit thereof to the half way down the mountain.

When the ignition switch 40 is turned off, the controller 30 detects the turn-off of the ignition switch 40 and starts controls the light modulation sections 21–25. The controller 30 gradually increases the control voltage applied to the sections 21–25, successively from the section 25 to the section 21 at intervals of time t, as shown in FIGS. 10A–10E. When the driver looks at the dial plate 10, the bottom of the display portions 11, 12, 13 becomes invisible from beginning, and the middle portions thereof gradually become invisible after certain time passes. Finally, the whole portion becomes invisible. As a result, the driver feels a sunset at a mountain, where the sun is gradually shining on the half way up the mountain and disappears from the summit thereof.

As a variation, the light transmissivity of the light modulation sections 21–25 may be controlled to increase from the bottom section 25 first when the ignition switch 40 is turned on. In this case, the light transmissivity of the light modulation sections 21–25 are controlled to decrease from the top section 21 first when the ignition switch 40 is turned on.

The delay time t may be variable. For example, the delay time may successively increase or decrease.

As another variation, the control voltage applied to all the light modulation sections 21–25 is controlled to be zero before the ignition switch 40 is turned on, and the control voltage applied to the individual sections is gradually and successively increased to a suitable voltage when the ignition switch 40 is turned on. The suitable voltage makes the light modulation sections 21–25 have a light transmissivity that is sufficiently clear for a driver to recognize the display portions without being dazzled. When a driver or passenger looks at the combination meter before the ignition key is turned on, he or she sees shining displays. Thus, the above arrangement gives a driver and passengers a novel and attractive atmosphere, particularly if the dial plate 20 is made of a lustrous member such as a thin metal plate.

The glass cover 3 may be omitted if the light modulation film 20 provides a sufficient protective strength.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. An indicating instrument for a vehicle comprising:
   a dial plate;
   a light modulation member having variable light transmissivity disposed on said dial plate; and
   control means for controlling said light transmissivity;
   wherein
      said light modulation member comprises a plurality of variable light modulation sections respectively connected to said control means,
      said control means separately controls light transmissivity of each of said plurality of variable light modulation sections, and
      said control means controls each of said plurality of light modulation sections to successively decrease the light transmissivity thereof when said ignition switch is turned on, and to successively increase said light transmissivity when said ignition switch is turned off.

2. The indicating instrument as claimed in claim 1, wherein said light modulation member comprises an electrochromic display device.

3. The indicating instrument as claimed in claim 1, wherein said dial plate has a plurality of display portions, and each of said variable light modulation sections covers one of said display portions.

4. The indicating instrument as claimed in claim 1, wherein said control means controls each of said plurality of light modulation sections to gradually change the light transmissivity of each of said plurality of light modulation sections when said ignition switch is operated.

5. An indicating instrument for a vehicle comprising:
   a dial plate having a plurality of display portions;
   a light modulation member having variable light transmissivity disposed on said dial plate and comprising a plurality of variable light modulation sections respectively covering said plurality of display portions; and
   control means for controlling said variable light transmissivity, wherein
      said control means controls said plurality of variable light modulation sections to successively change said light transmissivity thereof from one section to another when a vehicle ignition switch is operated.

6. The indicating instrument as claimed in claim 5, wherein said light modulation member comprises an electrochromatic display device.

7. The indicating instrument as claimed in claim 5, wherein said control means controls said light modulation member to gradually change the light transmissivity of each of said plurality of light modulation sections when said ignition switch is operated.

* * * * *